United States Patent [19]
Jhawar

[11] 3,922,317
[45] Nov. 25, 1975

[54] PRODUCTION OF PROPENYLNORBORNENE

[75] Inventor: Pannalal Sohanlal Jhawar, Stockton-on-Lees, England

[73] Assignee: Imperial Chemical Industries Limited, London, England

[22] Filed: Aug. 19, 1974

[21] Appl. No.: 498,855

[30] Foreign Application Priority Data
Aug. 29, 1973 United Kingdom............... 40574/73

[52] U.S. Cl.................... 260/668 PX; 260/681.5 R
[51] Int. Cl.².......................................... C07C 13/28
[58] Field of Search............................. 260/666 PY

[56] References Cited
UNITED STATES PATENTS
2,704,778   5/1955   Maisel.......................... 260/681.5 R 2,752,406   6/1956   Seyfried....................... 260/681.5 R
3,427,360   2/1969   Makowski..................... 260/666 PY FOREIGN PATENTS OR APPLICATIONS
1,297,081   11/1973   United Kingdom.......... 260/666 PY Primary Examiner—Veronica O'Keefe
Attorney, Agent, or Firm—Cushman, Darby & Cushman

[57] ABSTRACT

2-(1-propenyl)norbornene-5 is produced by condensing cyclopentadiene and piperylene and the product is separated in a series of four distillation stages optionally with recycle of certain by-products.

10 Claims, 1 Drawing Figure

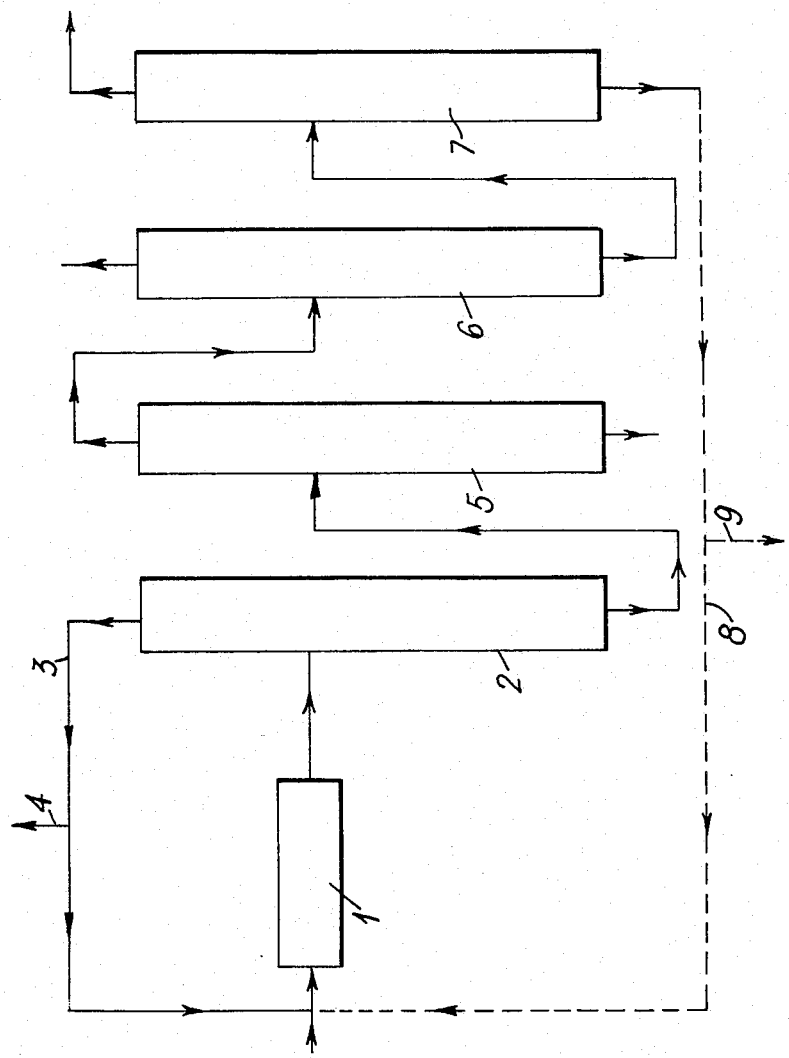

PRODUCTION OF PROPENYLNORBORNENE

The present invention relates to the production of 2-(1-propenyl) norbornene-5.

2-(1-propenyl(norbornene-5 (PNB) is a chemical compound which is useful inter alia as a termonomer for polymerisation with ethylene and propylene to produce a so-called EPDM rubber. PNB may be prepared by the reaction of cyclopentadiene with piperylene and in one economically attractive process of preparation the two reactants are components of a mixed $C_5$ hydrocarbon stream derived from a steam cracked naphtha or gas oil. This latter process is described in British Pat. No. 1,297,081, the $C_5$ stream being separated by distillation into an isoprene concentrate and a piperylene concentrate and the latter heated at 120° to 250°C to effect the reaction of the cyclopentadiene and piperylene. In this way the PNB may be obtained in admixture with other hydrocarbons such as dicyclopentadiene. Such a mixture, which may contain 50% or more PNB may be used directly as a termonomer but it is preferred that the mixture be refined to increase its PNB content, desirably to more than 90% by weight. Similarly even if pure cyclopentadiene is reacted with pure cis and/or trans-piperylene there still occur a number of by-products which present a difficult separation problem.

According to the present invention a process for the production of at least 90% pure 2-(1-propenyl)- norbornene-5 comprises:

a. condensing cyclopentadiene and piperylene,
b. distilling the condensate product to obtain a distillate fraction comprising unreacted cyclopentadiene and/or piperylene and a residue fraction comprising 2-(1-propenyl)norbornene-5,
c. distilling the residue fraction from (b) to produce a distillate fraction containing 2-(1-propenyl)norbornene-5 and a residue fraction comprising $C_{15}$ hydrocarbons,
d. distilling the distillate fraction from stage (c) to produce a residue fraction comprising 2-(1-propenyl)norbornene-5 and a distillate fraction comprising piperylene dimers,
e. distilling the residue fraction from stage
d. to produce a distillate fraction comprising at least 90% 2-(1-propenyl)norbornene-5 and a residue fraction comprising dicyclopentadiene and/or methyltetrahydroindenes.

It is preferred that the distillation processes be carried out continuously suitably in a series of distillation columns in which the distillate or residue, as the case may be, from one column is fed continuously to the next column.

Stage (a) of the process of the present invention may be carried out by reacting together substantially pure cyclopentadiene with substantially pure cis and/or trans-piperylene or a suitable diluent such as an inert hydrocarbon may also be present. In particular the cyclopentadiene and piperylene may be components of a mixed hydrocarbon stream as described in British Pat. No. 1,297,081. This mixed hydrocarbon stream is obtained by:

i. distilling a pyrolysis gasoline fraction derived from a cracked hydrocarbon feedstock such as naphtha or gas oil to produce a distillate boiling in the range 10° to 80°C and comprising piperylene, isoprene and cyclopentadiene, ii. redistilling the stage (i) distillate to produce an 'isoprene concentrate' and a 'piperylene concentrate'.

The 'isoprene concentrate' generally boils in the temperature range 10° to 40°C and may contain isoprene, isopentane, n-pentane and pentene-1 while the 'piperylene concentrate' usually boils in the range 35° to 80° and may contain cis- and trans-piperylene, cyclopentadiene/dicyclopentadiene, n-pentane, trans-pentene-2, 2-methyl-butene-2, cyclopentene and cyclopentane. If the 'piperylene concentrate' contain a sizeable amount of dicyclopentadiene then the distillation range of the mixture may have a final boiling point higher than 80°C, i.e. about 180°C. The 'piperylene concentrate' may be used in the process of the present invention as the source of both cyclopentadiene and piperylene.

The piperylene and cyclopentadiene are condensed by heating to a temperature preferably in the range 120° to 350°C, more preferably 150° to 250°C, particularly about 220°C. The reaction may take up to 24 hours and in general the higher the reaction temperature the shorter the time. Preferably the time taken is 1 to 60 minutes at 200°C to 250°C. It is preferred that the mole ratio of cyclopentadiene to piperylene in the stage (a) condensation be in the range 0.5 to 3 : 1, more preferably 1.0 to 2 : 1. The reaction is preferably carried out in the liquid phase, e.g. in a tubular reactor. The product of the reaction comprises 2-(1-propenyl) norbornene-5, dicyclopentadiene, piperylene dimers (various isomeric decadienes) 4- and 7-methyltetrahydroindene, 2-vinyl-3-methylnorbornene-5 and a number of $C_{15}$ hydrocarbons which are the result of homo and hetero trimerisation between cyclopentadiene and piperylene. In addition the reaction product may contain unreacted piperylene and cyclopentadiene and, if 'piperylene concentrate' was the source of the reactants, other $C_5$ hydrocarbons as described above.

The stage (b) distillation is carried out preferably at up to 30 p.s.i.a., particularly 15 to 30 p.s.i.a. pressure and suitably at an overheads temperature of up to 70°C, preferably 50° to 70°C and a boiler temperature up to 190°C, preferably 170° to 190°C. The distillate comprises the unreacted and non-reactive $C_5$ hydrocarbons and is preferably recycled back to the reaction. If 'piperylene concentrate' is used in the reaction then a purge is periodically taken from this recycle stream to reduce the level of non-reactive $C_5$ hydrocarbons in the system.

The stage (c) distillation takes place preferably at up to 2 p.s.i.a., particularly 0.5 to 2.0 p.s.i.a. pressure and suitably at an overheads temperature of up to 105°C, preferably 70° to 105°C and a boiler temperature of up to 205°C, preferably 160° to 205°C. The residue from this distillation comprises the $C_{15}$ hydrocarbons while the distillate comprises PNB et. The residue may conveniently be recycled to the reaction after passing through a thermal cracker to regenerate the $C_5$ hydrocarbons. The cracker preferably operates at a temperature in the range 250° to 400°C.

The stage (d) distillation is suitably carried out at up to 20 p.s.i.a., preferably 2 to 20 p.s.i.a. pressure and suitably at an overheads temperature of up to 175°C, preferably 100° to 175°C and a boiler temperature of up to 185°C, preferably 110° to 185°C. The distillate fraction from this distillation comprises the piperylene dimers and the residual fraction, the PNB, dicyclopentadiene and methyltetrahydroindenes. The distillate fraction may be recycled back to the reaction, if so desired, after the piperylene dimers are first broken down to their C₅ constituents by passage through a thermal cracker preferably operating at 500° to 600°C.

The stage (d) residual fraction forms the feed to the stage (e) distillation which conveniently operates at up to 20 p.s.i.a., preferably 2 to 20 p.s.i.a. pressure and suitably at an overheads temperature of up to 185°C, preferably 110° to 185°C and a boiler temperature of up to 190°C, preferably 115° to 190°C. The distillate from this distillation comprises 90% or more PNB at the will of the operator, the balance being dicyclopentadiene and a small amount of piperylene dimers. For use as a termonomer a 90% PNB fraction is satisfactory although, if desired, the PNB content may be increased further and by suitable operation of stage (d) and (e) distillations high quality PNB may be obtained. The residue from the stage (e) distillation may contain dicyclopentadiene and/or methyltetrahydroindenes. This fraction may be recycled directly back to the reaction to utilise the dicyclopentadiene. Alternatively it may be recycled together with the stage (c) residue and/or stage (d) distillate after passage through a thermal cracker.

The invention will now be further described with reference to the attached FIGURE which is a line diagram of the process.

A 'piperylene concentrate' comprising cis- and trans-piperylene (25 wt.%), cyclopentadiene/dicyclopentadiene (32 wt.%), n-pentane, trans-pentene-2, 2-methylbutene-2, cyclopentene and cyclopentane is passed continuously in the liquid phase through a reactor 1 which is heated to a temperature of 220°C. The residence time of the concentrate in the reactor is 12 minutes. The reaction product leaves the reactor and is cooled and fed to a distillation column 2 operated at atmospheric pressure and overheads and boiler temperatures of 50°C and 170°C respectively. The overheads from column 2 comprising n-pentane, trans-pentene-2, 2-methylbutene-2, cyclopentene, cyclopentane and unreacte piperylene and cyclopentadiene are recycled by line 3 back to reaction, a periodic purge being taken from 4 to prevent a build up of inert hydrocarbons in the reaction system. The residual fraction from column 2 is fed directly to column 5 which operates at 50 mm. pressure and overheads and boiler temperatures of 86°C and 172°C respectively.

The residual fraction from this column contains the C₁₅ trimers of cyclopentadiene and piperylene while the distillate fraction comprises C₁₀ hydrocarbons including PNB and forms the feed to column 6. The operating pressure in column 6 is 250 mm. and the overhead and boiler temperatures 128°C and 135°C respectively. The distillate from this column is a mixture of the isomeric decadienes (derived from the dimerisation of piperylene) and some PNB. The residual fraction contains most of the PNB, dicyclopentadiene and methyltetrahydroindenes which are split in column 7 into a distillate comprising 90% or more PNB and a residue containing the methyltetrahydroindenes and most of the dicyclopentadiene. This column has an operating pressure of 250 mm. and overhead and boiler temperatures of 130°C and 135°C respectively.

In a preferred modification of the above process shown as a dotted line on the line diagram the residual fraction from column 7 is recycled to the reaction through line 8. By this means the dicyclopentadiene is re-used in the reaction and the methyltetrahydroindenes are periodically removed from the system via purge line 9.

The invention will now be further described with reference to the following Example.

EXAMPLE

A piperylene concentrate comprising cis- and trans-piperylene (27 wt.%), cyclopentadiene/dicyclopentadiene (47 wt.%), n-pentane, trans-pentene-2, 2-methylbutene-2, cyclopentene and cyclopentane was reacted in the liquid phase at a temperature of 190°C. The residence time of the concentrate in the reactor was 90 minutes. The reaction product was comprised of 2-(1-propenyl)-norbornene-5 (13 wt.%), dicyclopentadiene (18 wt.%), piperylene dimers (4 wt. %), 4- and 7-methyltetrahydroindene (7 wt.%), 2-vinyl-3-methylnorbornene-5 (1 wt.%) and a number of C₁₅ hydrocarbons. In addition the reaction product contained unreacted piperylene and cyclopentadiene, and other C₅ hydrocarbons.

The reaction product from the reactor was cooled and fed to a distillation column operated at atmospheric pressure and overheads and boiler temperatures of 45°C and 172°C respectively. The reflux ratio was 1 : 1. The unreacted piperylene and cyclopentadiene and other C₅ hydrocarbons were removed as an overhead fraction. The residual fraction from the column, comprising 2-(1-propenyl)norbornene-5 (20 wt.%) was fed directly to a distillation column which operated at 50 mm. pressure and overheads and boiler temperatures of 88°C and 173°C respectively. The reflux ratio was 1 : 1.

The residual fraction from this column contained the C₁₅ trimers of cyclopentadiene and piperylene while the distillate fraction comprised 2(1-propenyl)norbornene-5 (33 wt.%) and the other C₁₀ hydrocarbons formed by the reaction of cyclopentadiene and piperylene. This overheads fraction was fed directly to a high efficiency column operated at 250 mm. pressure and overheads and boiler temperatures of 125°C and 136°C respectively. The reflux ratio was 100 : 1. The small quantity of distillate from this column comprised piperylene dimers (36 wt.%) and 2-(1-propenyl)norbornene-5 (60 wt.%). The residual fraction comprised 2-(1-propenyl)norbornene-5 (30 wt.%), dicyclopentadiene and methyltetrahydroindenes.

The residual fraction was fed directly to a high efficiency column operated at 150 mm. pressure and overheads and boiler temperatures of 109°C and 117°C respectively. The reflux ratio as 60 : 1. This fraction was split into a distillate comprising 2-(1-propenyl)-norbornene-5 (91 wt.%) and a residue comprising methyltetrahydroindenes (28 wt.%) and dicyclopentadiene (63 wt.%).

I claim:

1. A process for the production of at least 90% pure 2-(1-propenyl)norbornene-5 which comprises:
   a. condensing cyclopentadiene and piperylene,
   b. distilling the condensation product to obtain a distillate fraction comprising unreacted cyclopentadiene and/or piperylene and a residue fraction comprising 2-(1-propenyl)norbornene-5,
   c. distilling the residue fraction from (b) to produce a distillate fraction containing 2-(1-propenyl)-norbornene-5 and a residue fraction comprising C₁₅ hydrocarbons,
   d. distilling the distillate fraction from stage (c) to produce a residue fraction comprising 2-(1- propenyl)norbornene-5 and a distillate fraction comprising piperylene dimers, e. distilling a residue fraction from stage (d) to produce a distillate fraction comprising at least 90% 2-(1-propenyl)norbornene-5 and a residue fraction comprising dicyclopentadiene and/or methyl-tetrahydroindenes.

2. A process as claimed in claim 1 in which the cyclopentadiene and piperylene in stage (a) are components of a mixed hydrocarbon stream which is obtained by:
  i. distilling a pyrolysis gasoline fraction derived from a cracked hydrocarbon feedstock to produce a distillate boiling in the range 10° to 80°C and comprising piperylene, isoprene and cyclopentadiene, and
  ii. redistilling the stage (i) distillate to produce an "isoprene concentrate" and a "piperylene concentrate" as hereinbefore defined.

3. A process as claimed in claim 1 in which the piperylene and cyclopentadiene are condensed in stage (a) at a temperature in the range 120° to 350°C.

4. A process as claimed in claim 1 in which the stage (b) distillation is carried out at 15 to 30 p.s.i.a. pressure and at an overheads temperature of 50° to 70°C and a boiler temperature of 170° to 190°C.

5. A process as claimed in claim 1 in which the stage (c) distillation is carried out at 0.5 to 2.0 p.s.i.a. pressure and at an overheads temperature of 70° to 105°C and a boiler temperature of 160° to 205°C.

6. A process as claimed in claim 1 in which the stage (d) distillation is carried out at 2 to 20 p.s.i.a. pressure and at an overheads temperature of 100° to 175°C and a boiler temperature of 110° to 185°C.

7. A process as claimed in claim 1 in which the stage (e) distillation is carried out at 2 to 20 p.s.i.a. pressure and at an overheads temperature of 110° to 185°C and a boiler temperature of 115° to 190°C.

8. A process as claimed in claim 1 in which one or more of the stage (b) or (d) distillate fractions or the stage (c) or (e) residue fractions are thermally cracked and recycled to the stage (a) condensation.

9. A process for the production of at least 90% pure 2-(1-propenyl)-norbornene-5 as claimed in claim 1 which comprises:
  a. condensing cyclopentadiene and piperylene at a temperature in the range 120° to 350°C,
  b. distilling the condensation product at up to 30 p.s.i.a. pressure and overheads and boiler temperatures up to 70° and 190° respectively to obtain a distillate fraction comprising unreacted cyclopentadiene and/or piperylene and a residue fraction comprising 2-(1-propenyl)norbornene-5,
  c. distilling the residue fraction from (b) at up to 2 p.s.i.a. pressure and overheads and boiler temperatures up to 105° and 205°C respectively to produce a distillate fraction containing 2-(1-propenyl)norbornene-5 and a residue fraction comprising $C_{15}$ hydrocarbons,
  d. distilling the distillate fraction from stage (c) at up to 20 p.s.i.a. pressure and overheads and boiler temperatures up to 175° and 185°C respectively, to produce a residue fraction comprising 2-(1-propenyl)norbornene-5 and a distillate fraction comprising piperylene dimers,
  e. distilling the residue fraction from stage (d) at up to 20 p.s.i.a. pressure and overheads and boiler temperatures up to 185° and 190°C respectively to produce a distillate fraction comprising at least 90% 2-(1-propenyl)norbornene-5 and a residue fraction comprising dicyclopentadiene and/or methyl tetrahydroindenes.

10. A process as claimed in claim 9 in which the mole ratio of cyclopentadiene to piperylene in the stage (a) condensation is the range 0.5 to 3 : 1.

* * * * *